United States Patent [19]

Pappas

[11] Patent Number: 4,477,352
[45] Date of Patent: Oct. 16, 1984

[54] FUEL FILTER

[76] Inventor: Harry J. Pappas, 1224 Cashman Dr., Las Vegas, Nev. 89102

[21] Appl. No.: 475,148

[22] Filed: Mar. 14, 1983

[51] Int. Cl.³ .............................................. B01D 29/14
[52] U.S. Cl. .................................... 210/448; 210/452
[58] Field of Search ............... 210/446, 448, 449, 450, 210/452

[56] References Cited

U.S. PATENT DOCUMENTS 4,018,686  4/1977  Shufflebarger et al. ............ 210/448

Primary Examiner—Frank Sever
Attorney, Agent, or Firm—Hubbard & Stetina

[57] ABSTRACT

An improved fuel filter particularly adapted for use on sport and off-road vehicles such as go-carts, motorcycles, and the like, is disclosed characterized by a two-piece barrel housing sized to removably receive a replaceable/disposable filter element. Five embodiments of fuel filter structure are disclosed each adapted to permit the filter element to be readily replaced and properly seated within the housing.

11 Claims, 6 Drawing Figures

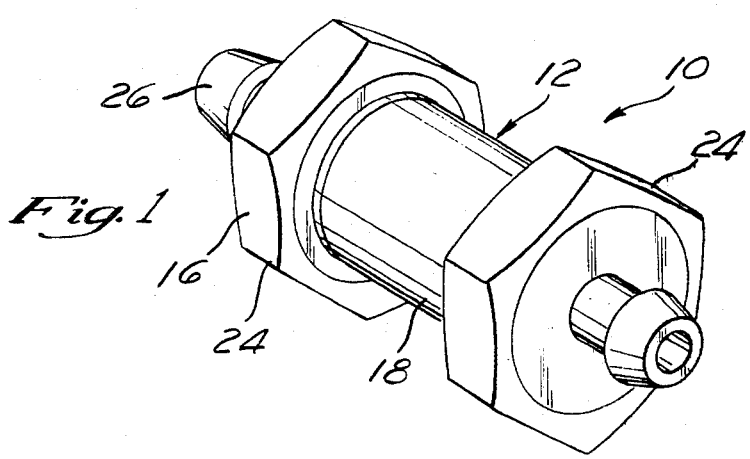
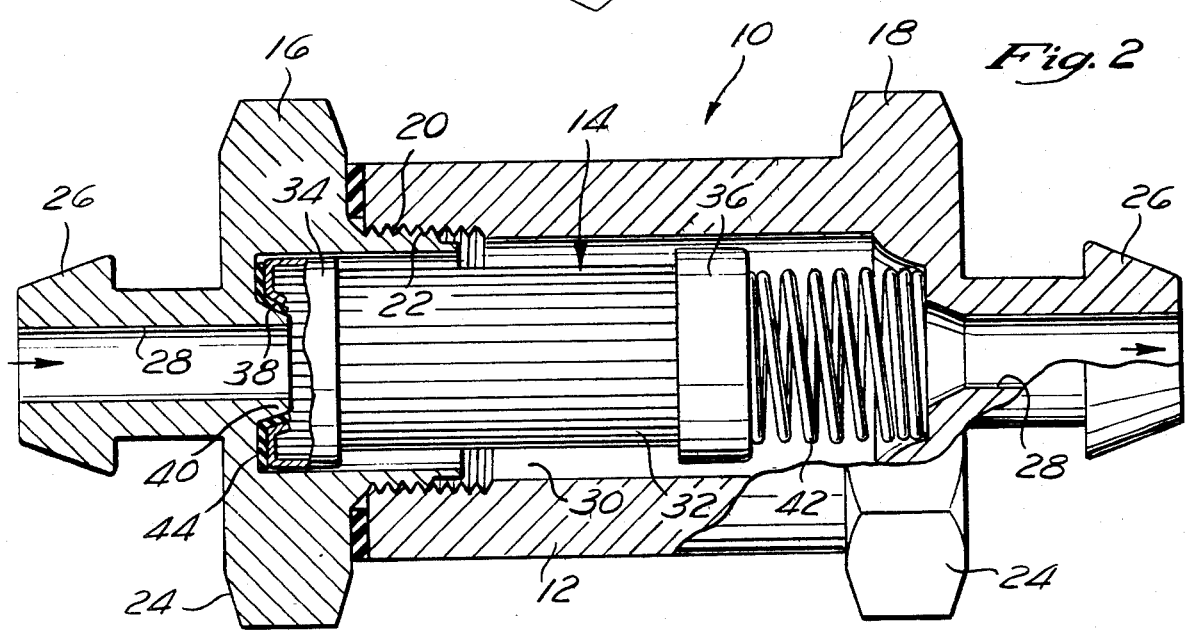
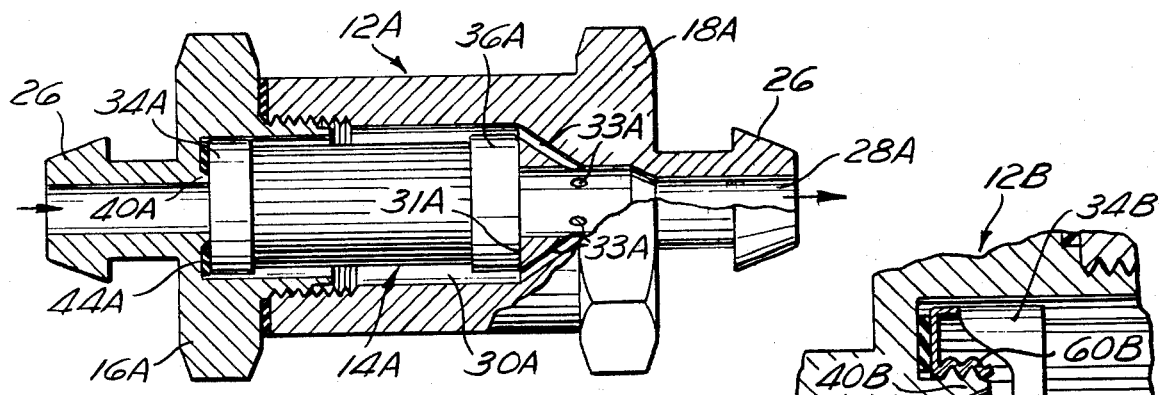
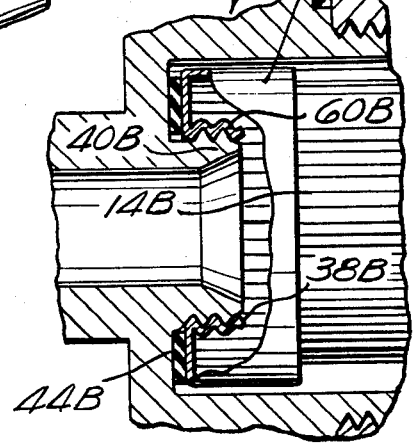

FUEL FILTER

BACKGROUND OF THE PRESENT INVENTION

The present invention relates to fuel filters and, more particularly, to an improved fuel filter specifically adapted for use on sport and off-road vehicles such as go-carts, motorcycles, and the like.

As is well known, it is customary practice for internal combustion engines to utilize fuel filters to prevent dirt and other particulate contaminants from entering into the carburetor and/or fuel injection system, and thus, insure trouble-free engine operation. Heretofore, most if not all of the conventional prior art fuel filters have been formed with a composite or integrally formed housing and filter element structure which has mandated replacement of the entire composite housing/filter element structure when the filter element has become dirty during use. Although such conventional prior art fuel filters have proven generally satisfactory for standard on-road vehicles, they possess inherent deficiencies for sport or off-road vehicles such as go-carts, motorcycles, and the like, which are subject to high dirt environments.

In this regard, the high dirt and contaminant environments typically encountered in sport or off-road vehicle use has necessitated numerous short term replacement of the conventional prior art fuel filters which due to their composite housing/filter element structure, has proven extremely cost prohibitive. In addition, due to the requirement of replacement of both the housing and filter element in the convention prior art fuel filters, the numerous replacement of the filters in the fuel line has oftentimes permanently damaged the fuel line requiring subsequent replacement of the fuel line as well.

Thus, there exists a substantial need in the art for an improved fuel filter particularly adapted for sport and off-road vehicle use which permits the rapid replacement of fuel filter elements at lower cost and without the propensity of damaging the fuel lines of the internal combustion engine.

SUMMARY OF THE PRESENT INVENTION

The present invention specifically addresses and alleviates the above-referenced deficiencies associated in the art. More particularly, the present invention discloses an improved fuel filter specifically adapted for use on sport and off-road vehicles such as go-carts, motorcycles, and the like, which incorporates a two-piece barrel housing sized to removably receive a replaceable/disposable filter element therein. Due to the filter element being replaceable within the housing, upon becoming dirty, only the disposable filter element need be replaced with the housing being capable of re-use. Since the disposable filter elements can be mass-produced at relatively slight costs, the present invention thereby substantially decreases filtering costs as compared to conventional composite housing/element fuel filters.

In addition, due to only the disposable filter element being replaced when becoming dirty as opposed to the entire housing and filter element, the housing may typically remain connected to the fuel line during replacement of the filter element thereby reducing the possibility of damaging the fuel line.

Five separate embodiments of the improved fuel filter structure are disclosed which are all adapted to permit the filter element to be rapidly replaced and properly seated within the housing and insure adequate fuel filtration. In addition, the present invention permits the disposable filter elements to be manufactured by conventional technology and incorporated into the fuel filter of the present invention.

DESCRIPTION OF THE DRAWINGS

These as well as other features of the present invention will become more apparent upon reference to the drawings, wherein:

FIG. 1 is a perspective view of the improved fuel filter of the present invention;

FIG. 2 is an enlarged cross-sectional view of a first embodiment of the fuel filter of the present invention illustrating the detailed construction of the housing, disposable filter element, and means for seating the filter element within the housing;

FIG. 3 is a cross-sectional view of a second embodiment of the fuel filter of the present invention illustrating a different structure for seating the disposable filter element within the housing;

FIG. 4 is a partial cross-sectional view of a third embodiment of the fuel filter of the present invention illustrating an additional structure for seating the filter element within the housing;

DETAILED DESCRIPTION OF THE PREFERRED EMBODIMENT

Figure 5:
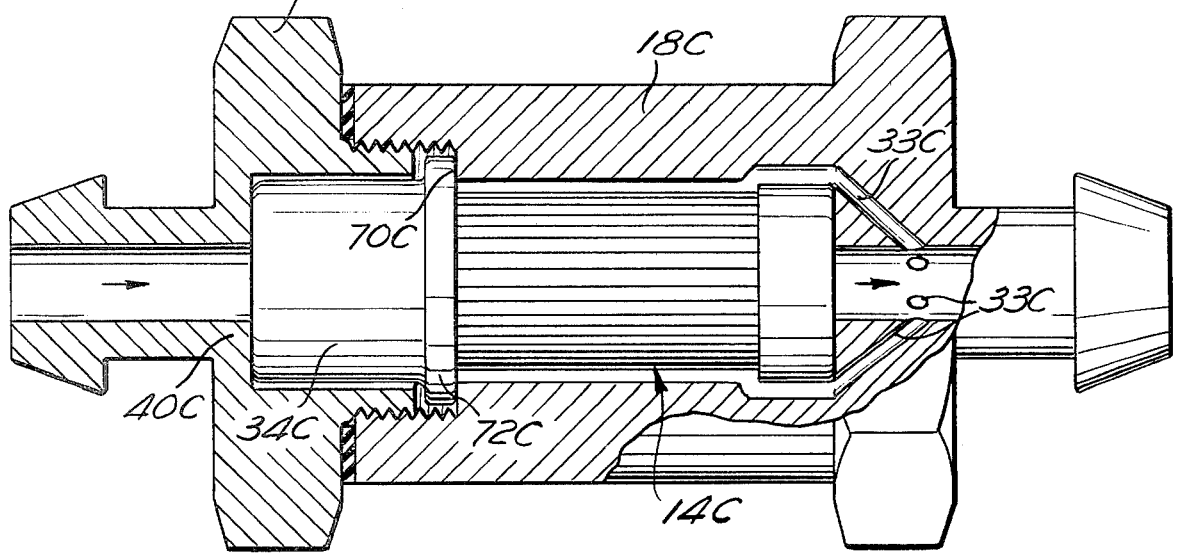
FIG. 5 is a cross-sectional view of a fourth embodiment of the fuel filter of the present invention illustrating an additional structural for seating the filter element within the housing.

Referring to FIG. 1, there is shown the improved fuel filter 10 of the present invention particularly adapted for use on sport and off-road vehicles such as motorcycles, go-carts, and the like, which due to being operated in high dirt environments require numerous replacement of conventional fuel filters. The fuel filter 10 is composed generally of a barrel housing 12 and disposable filter element 14. The housing 12 is typically formed of a metallic material such as brass and fabricated having two housing segments 16 and 18 which may be interconnected as by way of mating threads 20 and 22 formed on each of the housing segments 16 and 18, respectively.

Opposite ends of the housing segments 16 and 18 include an enlarged hexagonal flange 24 which accommodates conventional assembly tools such as a wrench (not shown) as well as a male shank portion 26 adapted to be connected to a conventional fuel line, i.e. flexible tubing. Each of the shank portions 26 include a concentric axial aperture 28 which form the inlet and outlet, respectively, of the fuel filter 10. An enlarged annular aperture or chamber 30 is formed within the interior of the housing 12 and is sized to receive the disposable filter element 14 therein.

The filter element 14 includes a corregated paper tubular-shaped filtering surface 32 and a pair of end caps 34 and 36. One of the end caps 34 has an opening 38 formed therein sized to be tightly received on a frustro conical-shaped shoulder or seat 40 formed upon the housing segment 16. A spring 43 cooperates with the end cap 36 to continuously bias the filter element 14 toward the seat 40 and a gasket 44 is positioned upon the end cap 34 to insure that the end cap 34 is sealed against the seat 40.

With the structure defined, the operation of the improved fuel filter 10 of the present invention may be described. Initially, the fuel filter 10 must be installed within the fuel line (not shown) of the internal combustion engine utilizing the flare flanges 26 formed on the opposite ends of the housing 12. Once installed, fuel flow is permitted through the central aperture 28 and into the interior of the fuel element 14. As the fuel flows through the filtering surface 32 of the filter element 14, dirt particles and contaminants are screened from passage through the filter element 14 while clean fuel flow travels through the remaining portion of the chamber 30 for exit through the central aperture 28 as indicated by the arrows in FIG. 2.

When the filter element 14 becomes dirty through use, a user need only unthread the two housing segments 16 and 18 from one another as by way of a pair of wrenches (not shown) positioned upon the hexagonal flanges 24. In most instances, this unthreading procedure may be accommodated without disconnection of the housing segments 16 and 18 from the fuel line; however, in all instances, only one of the flange portions 26 need be removed from the fuel line to effectuate the same. With the housing segments 16 and 18 separated from one another, the fuel element 14 may be removed from the chamber 30 and discarded and subsequently replaced with a new fuel element 14. The housing segments may then be rethreaded together whereby the fuel element 14 is properly sealed upon the seat 40. Fuel flow through the filter may then be re-initiated in the manner previously described.

Due to the fuel element 14 being manufactured at extremely low cost, it will be recognized that overall cost of fuel filter replacements may be dramatically reduced by way of the present invention which in relation to sport and off-road vehicle applications is an extremely important factor.

Referring to FIG. 3, an additional embodiment of the fuel filter 10 is disclosed. As will be noted, in this second embodiment, the housing 12A and filter element 14A is formed in substantially the same configuration as the housing 12 and element 14 of the first embodiment except that the filter chamber 30A includes a shorter axial length than the chamber 30 in the first embodiment.

More particularly, the axial length of the chamber 30A is sized to be equal to or slightly less than the axial length of the filter element 14A such that when the housing segments 16A and 18A are threaded tightly together, the rear annular wall or shoulder 31A formed in the housing segment 18 abuts the end cap 36A of the filter element 14A and urges the opposite end cap 34A tightly against the gasket 44A. As such, the filter element 14A is properly seated against the valve seat 40A without the need of the spring 42 as utilized in the first embodiment of the invention. In addition, in this embodiment, a plurality of flow passages 33A are provided extending from the chamber 30A to the outlet such that filtered fuel may pass through the filter 10.

Referring to FIG. 4, a third embodiment of the fuel filter 10 of the present invention is illustrated. In this third embodiment, the housing 12B is the same as the housing 12A of FIG. 3 except that the seat 40A is replaced by a threaded annulus 40B. In addition, the end cap 34B includes an enlarged central opening 38B having complimentary or mating threads 60B formed therein. As such, it will be recognized that the filter element 14B may be sealingly engaged adjacent the inlet of the housing 12B merely by screwing the filter element 14B unto the annulus 40B. The threading of the filter element 14B may continue until such time as the end cap 34B contacts the gasket 44B and causes a slight compression of the same thereby insuring that a sealed interface between the filter element 14B and housing 12B is effectuated.

Referring to FIG. 5, an additional embodiment of the fuel filter 10 of the present invention is depicted which is similar in construction to the embodiment of FIG. 3. In this embodiment, however, the end cap 34C of the filter element 14C includes an enlarged diameter flange 72C and the housing segment 18C includes an enlarged annular shoulder 70C. The shoulder 70C is spaced from the end of the housing segment 18C by a distance sufficient to contact or abutt the annular shoulder 72C when the housing segment 16C and 18C are threaded together. During this abuttment, the end cap 34C is thus tightly biased against the end cap 16C to insure that sealing engagement is made between the end cap 34C and housing segment 16C. As such, fuel flow in the directions of the arrow indicated in FIG. 5 is effectuated through the filter element 14C and subsequently through the passageways 33C to the outlet.

Figure 6:
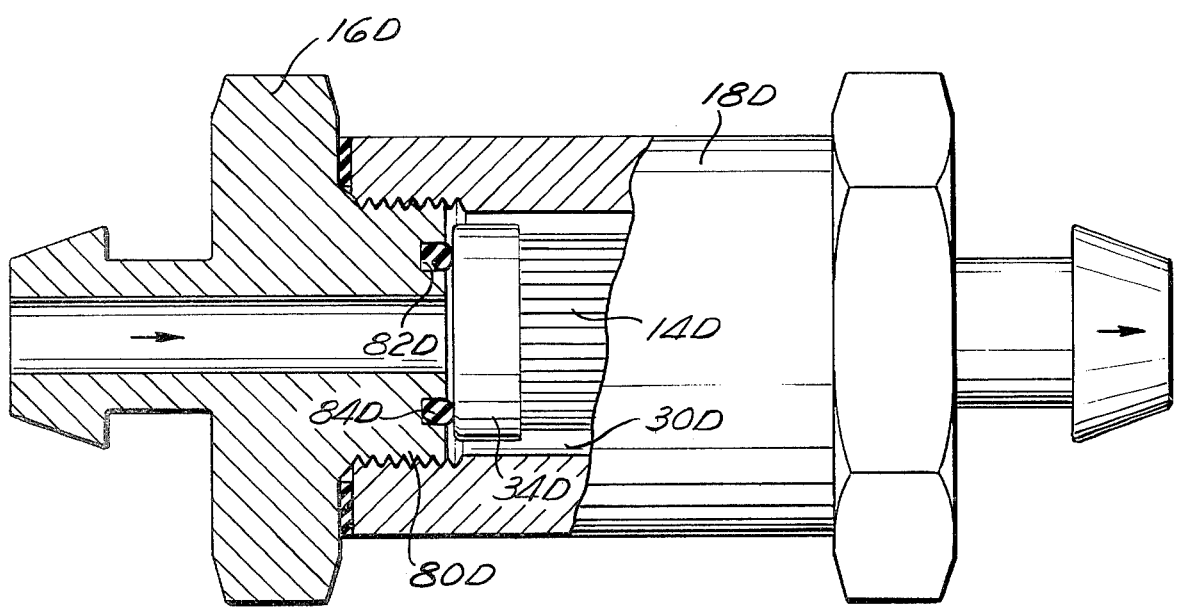
FIG. 6 is a partial cross-sectional view of a fifth embodiment of the fuel filter of the present invention illustrating an additional structure for seating the filter element within the housing.

Referring to FIG. 6, an additional embodiment of the fuel filter 10 is illustrated which includes an annular portion 80D being formed in the housing section 16D to extend a short distance into the filtering chamber 30D. The annular face of the portion 80D is provided with a circumferential groove 82D which is sized to receive an O-ring 84D therein. Due to the filter chamber 30D being equal to or slightly less than the axial length of the filtering element 14D, the housing segment 16D and 18D threaded together, the end cap 34D presses against the O-ring 82D causing a slight compression which forms a seal of the end cap 34 adjacent the inlet of the housing segment 16D. Thus, fuel flow entering through the inlet is free to travel into the filter element 14D and subsequently through the filter chamber 30D and outlet.

Therefore in summary, the present invention comprises a substantial improvement in the art by providing a fuel filter for sport and off-road vehicles which may be utilized at a substantially reduced cost as compared to conventional fuel filters. Although in the preferred embodiments certain materials, selections, and component structures and sizes have been defined, those skilled in the art will recognize that various modifications to the same can be accomplished without departing from the spirit of the present invention and such modifications are clearly contemplated herein.

What is claimed is:

1. An improved fuel filter particularly adapted for use on sport and off-road internal combustion engine vehicles comprising:

a housing formed of a first and second housing segment defining an inlet, an outlet and a filter element chamber disposed between said inlet and outlet;

flange means formed on said housing adjacent to said inlet and outlet for connecting said housing to the fuel line of the internal combustion engine of the vehicle;

a disposable tubular filter element sized to be received within said filter chamber and filter fuel flow between said inlet and outlet; and means designed, dimensioned, and arranged for providing quick replacement of and assuring a reliable seal for said filter element within said filter chamber under extremely dirty and hot conditions of extreme vibration, said means including an annular shoulder formed adjacent said inlet sized to be received within one end of said filter element to securely hold said filter element in a parallel orientation to the axis of said filter chamber and to sealingly engage said filter element to said first housing segment adjacent to said inlet to require fuel flow through said inlet to travel through said filter element prior to flow through said outlet, means for continuously biasing said filter element tightly against said annular shoulder and means for removably mounting said first and second housing segments together.

2. The fuel filter of claim 1 wherein said biasing means comprises a spring disposed within said filter element chamber adapted to contact the other end of said filter element and continuously bias said filter element tightly against said annular shoulder.

3. The fuel filter of claim 1 further comprises:
a threaded annular seat formed on said annular shoulder; and
a mating threaded aperture formed on said one end of said filter element adapted to permit said filter element to be threaded unto said annular seat.

4. The fuel filter of claim 1 further comprising:
an enlarged flange formed on said filter element adapted to abut a portion of said second housing segment and bais said one end of said filter element tightly against said annular shoulder causing said filter element to be held in a position parallel to the axis of said filter chamber.

5. The fuel filter of claim 1 wherein said annular shoulder comprises a frustro-conical shaped annular shoulder.

6. The fuel filter of claim 5 further comprising a gasket positioned between said housing and said one end of said filter element.

7. The fuel filter of claim 6 wherein said gasket comprises an O-ring.

8. The fuel filter of claim 1 wherein said removably mounting means comprises a pair of mating threaded portions formed on said first and second housing segments adapted to permit said first and second housing segments to be threaded together.

9. The fuel filter of claim 8 wherein said housing includes a hexagonal flange formed on each of said first and second housing segments adapted to be grasped with a wrench.

10. The fuel filter of claim 9 wherein said housing is formed of a metallic material.

11. The fuel filter of claim 10 wherein said housing is formed of brass.

* * * * *